United States Patent
Lopez Simental et al.

(10) Patent No.: US 12,358,628 B2
(45) Date of Patent: Jul. 15, 2025

(54) DEHUMIDIFIER QUILT SYSTEMS AND METHODS

(71) Applicant: ROHR, INC., Chula Vista, CA (US)

(72) Inventors: Pamela Monttserrat Lopez Simental, Chula Vista, CA (US); Isabel Cole, San Diego, CA (US); Steven Kestler, San Diego, CA (US); Maxwell Robertson, El Cajon, CA (US)

(73) Assignee: ROHR, INC., Chula Vista, CA (US)

( * ) Notice: Subject to any disclaimer, the term of this patent is extended or adjusted under 35 U.S.C. 154(b) by 502 days.

(21) Appl. No.: 17/717,852

(22) Filed: Apr. 11, 2022

(65) Prior Publication Data

US 2023/0322392 A1    Oct. 12, 2023

(51) Int. Cl.
  *B64D 13/00*    (2006.01)
  *B01D 53/26*    (2006.01)
  *B01D 53/30*    (2006.01)
  *B64D 13/06*    (2006.01)

(52) U.S. Cl.
  CPC .......... *B64D 13/06* (2013.01); *B01D 53/265* (2013.01); *B01D 53/30* (2013.01); *B64D 2013/0662* (2013.01)

(58) Field of Classification Search
  CPC ............ B64D 13/06; B64D 2013/0662; B64D 2033/0206; B64D 33/02; B64D 33/04; B01D 53/265; B01D 53/30; B64F 5/30; B64F 5/40
  See application file for complete search history.

(56) References Cited

U.S. PATENT DOCUMENTS

| | | | |
|---|---|---|---|
| 9,791,364 B2 | 10/2017 | Iannone | |
| 10,173,248 B2 | 1/2019 | Dean et al. | |
| 11,161,586 B2 | 11/2021 | Wesseloh et al. | |
| 2004/0111912 A1* | 6/2004 | Storrer | F26B 21/004 34/92 |
| 2010/0300660 A1* | 12/2010 | Bourgault | E01H 8/08 165/104.34 |
| 2016/0115684 A1 | 4/2016 | Joynson | |
| 2018/0030896 A1* | 2/2018 | Roach | G10K 11/172 |
| 2020/0101690 A1* | 4/2020 | Oishi | B64D 33/02 |
| 2021/0181133 A1 | 6/2021 | Humfeld et al. | |
| 2021/0289998 A1* | 9/2021 | Yoo | A45D 20/12 |

FOREIGN PATENT DOCUMENTS

| | | |
|---|---|---|
| DE | 19502803 | 8/1995 |
| DE | 19721795 | 11/1998 |

OTHER PUBLICATIONS

European Patent Office, European Search Report dated Aug. 22, 2023 in Application No. 23167432.6.
European Patent Office, European Office Action dated Feb. 7, 2025 in Application No. 23167432.6.

* cited by examiner

*Primary Examiner* — T. Bennett McKenzie
(74) *Attorney, Agent, or Firm* — SNELL & WILMER L.L.P.

(57) ABSTRACT

A method for dehumidifying a perforated acoustic skin includes disposing a sheet of material over a perforated acoustic skin, sealing a periphery of the sheet of material to the perforated acoustic skin to form a cavity between the sheet of material and the perforated acoustic skin, disposing at least one dehumidifier in fluid communication with the cavity, and activating the dehumidifier to remove moist air from a core of the perforated acoustic skin. The dehumidifier(s) may be mounted to the sheet of material.

18 Claims, 4 Drawing Sheets

DEHUMIDIFIER QUILT SYSTEMS AND METHODS

FIELD

The present disclosure relates generally to dehumidifiers and, more particularly, to dehumidifiers used with aircraft.

BACKGROUND

Aircraft propulsion systems have acoustic liners for mitigating the acoustic signature generated during operation thereof. Acoustic liners generally can include a perforated front skin, a back skin, and a core material disposed therebetween. The core material of the acoustic liner is generally open to fan and/or bypass air via the perforated front skin.

SUMMARY

A method for dehumidifying a perforated acoustic skin is disclosed. The method comprises disposing a sheet of material over the perforated acoustic skin, the perforated acoustic skin comprising a plurality of perforations in fluid communication with a core of the perforated acoustic skin, sealing a periphery of the sheet of material to the perforated acoustic skin to form a cavity between the sheet of material and the perforated acoustic skin, disposing a dehumidifier in fluid communication with the cavity, and activating the dehumidifier to remove moist air from the core.

In various embodiments, the method further comprises removing the sheet of material from the perforated acoustic skin before a subsequent flight of an aircraft upon which the perforated acoustic skin is located.

In various embodiments, the perforated acoustic skin is located on an aircraft nacelle.

In various embodiments, the method further comprises detecting a humidity level within the cavity.

In various embodiments, the method further comprises detecting a first humidity level above a first predetermined threshold, wherein the activating the dehumidifier is in response to the detecting the first humidity level.

In various embodiments, the method further comprises detecting a second humidity level below a second predetermined threshold, and deactivating the dehumidifier in response to the detecting the second humidity level.

In various embodiments, the method further comprises routing a condensed moisture to a location located externally from an aircraft nacelle.

A dehumidifier system is disclosed, comprising a sheet of material comprising a first surface opposing a second surface, a seal located on the second surface and extending around a periphery of the sheet of material, and at least one dehumidifier coupled to the sheet of material.

In various embodiments, the sheet of material comprises a water repellant material.

In various embodiments, the least one dehumidifier is in fluid communication with the second surface.

In various embodiments, the least one dehumidifier is configured to be sealed from the first surface with the seal.

In various embodiments, the sheet of material comprises at least one of a plastic film or a tightly woven fabric.

In various embodiments, the seal comprises an adhesive.

In various embodiments, the dehumidifier system further comprises an outlet tube extending from the least one dehumidifier for routing a condensed moisture away from the sheet of material.

In various embodiments, the at least one dehumidifier is mounted to the sheet of material.

In various embodiments, the dehumidifier system further comprises a humidity sensor in electronic communication with the at least one dehumidifier.

In various embodiments, the dehumidifier system further comprises a controller configured to activate the at least one dehumidifier in response to the humidity sensor detecting a humidity level that satisfies a predetermined threshold.

A method for dehumidifying a perforated acoustic skin of an aircraft is disclosed, the method comprising sealing a sheet of material to the perforated acoustic skin to form a cavity between the sheet of material and the perforated acoustic skin, disposing a dehumidifier in fluid communication with the cavity, activating the dehumidifier to remove moist air from a core of the perforated acoustic skin, and removing the sheet of material and the dehumidifier from the perforated acoustic skin before a subsequent flight of the aircraft.

In various embodiments, the method is performed between flights of the aircraft while the aircraft is stationary on a ground surface.

In various embodiments, the dehumidifier is mounted to the sheet of material.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Dehumidifying methods of the present disclosure may be performed between flights of an aircraft while the aircraft is stationary on a ground surface (e.g., at an airport gate). Dehumidifying methods of the present disclosure may be performed as part of a maintenance process when the aircraft and/or the nacelle is in storage. An acoustic liner may comprise a metal material such as aluminum. A dehumidifier system of the present disclosure may comprise a sheet of water repellant material comprising at least one dehumidifier and a seal for forming a cavity or plenum over an acoustic liner. The dehumidifier system may be activated to evacuate moisture from within the acoustic liner to reduce the potential for oxidation and/or corrosion of the acoustic liner. Any condensed moisture may be captured and removed from the acoustic liner. In various embodiments, the dehumidifier is automatically turned on based upon feedback from a humidity sensor. In various embodiments, the dehumidifier is manually turned on. In various embodiments, the dehumidifier system is a removable stick-on sheet. In various embodiments, the seal and dehumidifier(s) are coupled to sheet of material to form a single-piece system.

Figure 1:
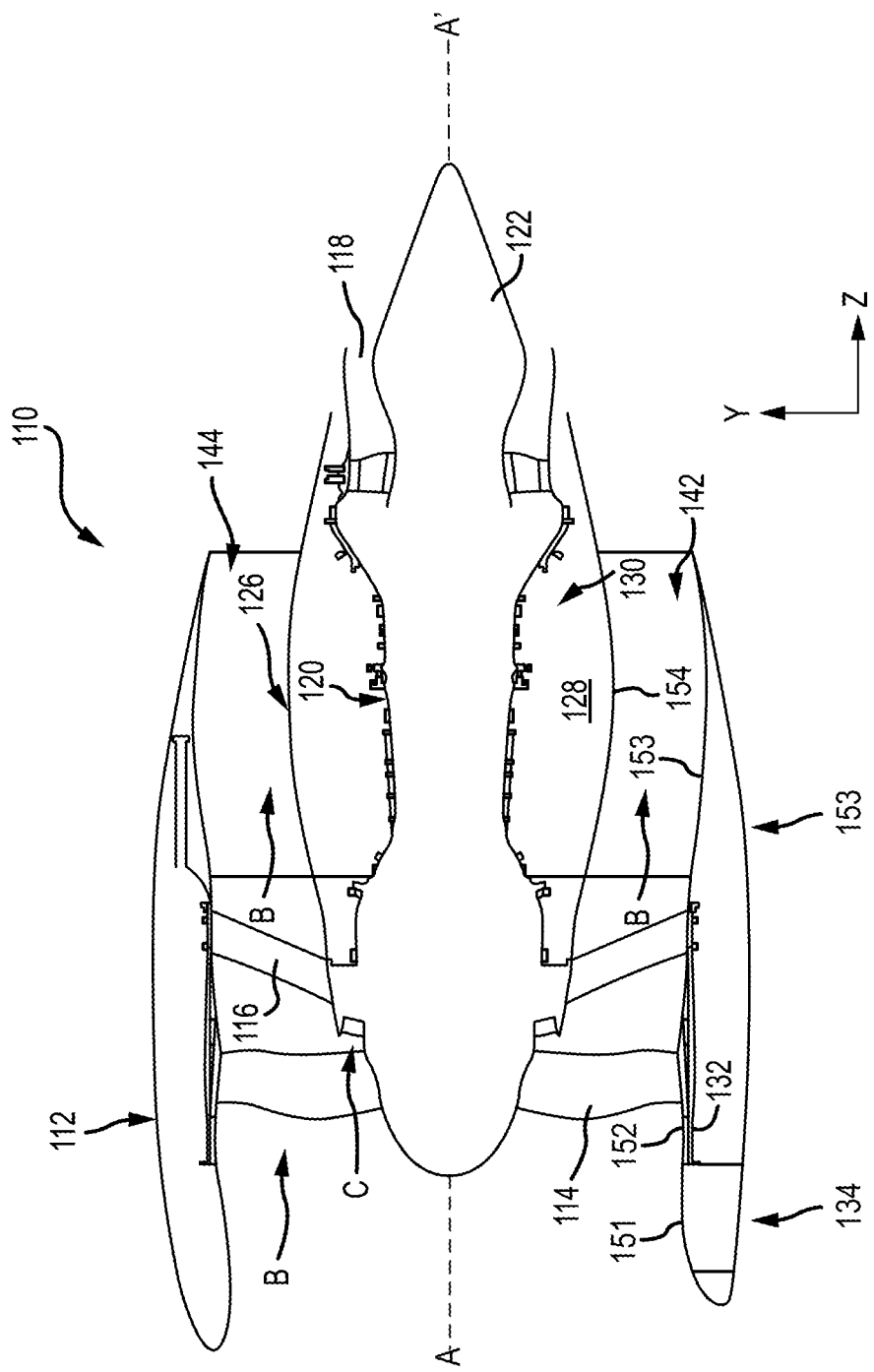
FIG. 1 is a schematic sectional illustration of an exemplary gas turbine engine, in accordance with various embodiments.

FIG. 1 illustrates a schematic view of a gas turbine engine, in accordance with various embodiments. Xyz-axes are provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112. Fan 114 may rotate about an engine centerline axis A-A'.

Nacelle 112 typically comprises two halves which are typically mounted to a pylon of an aircraft. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

In various embodiments, various surfaces of gas turbine engine 110 may be treated with acoustic skins (also referred to as acoustic liners or perforated skins). For example, an acoustic skin 151 may be located at an inner flow surface of the nacelle inlet, in various embodiments; an acoustic skin 152 may be located at an inner flow surface of the fan case 132, in various embodiments; an acoustic skin 152 may be located at an inner flow surface of the thrust reverser (e.g., at least partially defining the bypass flow path B), in various embodiments; and an acoustic skin 154 may be located at a flow surface of the inner fixed structure 126 (e.g., at least partially defining the bypass flow path B). Moreover, other portions of the gas turbine engine 110 may be treated with acoustic skins.

It should be understood that, although described in connection with a gas turbine engine, dehumidifier systems of the present disclosure may be used in connection with acoustic skins (or liners) associated with other types of engines or other parts of an aircraft, and are not limited to gas turbine engines.

Figure 2A:
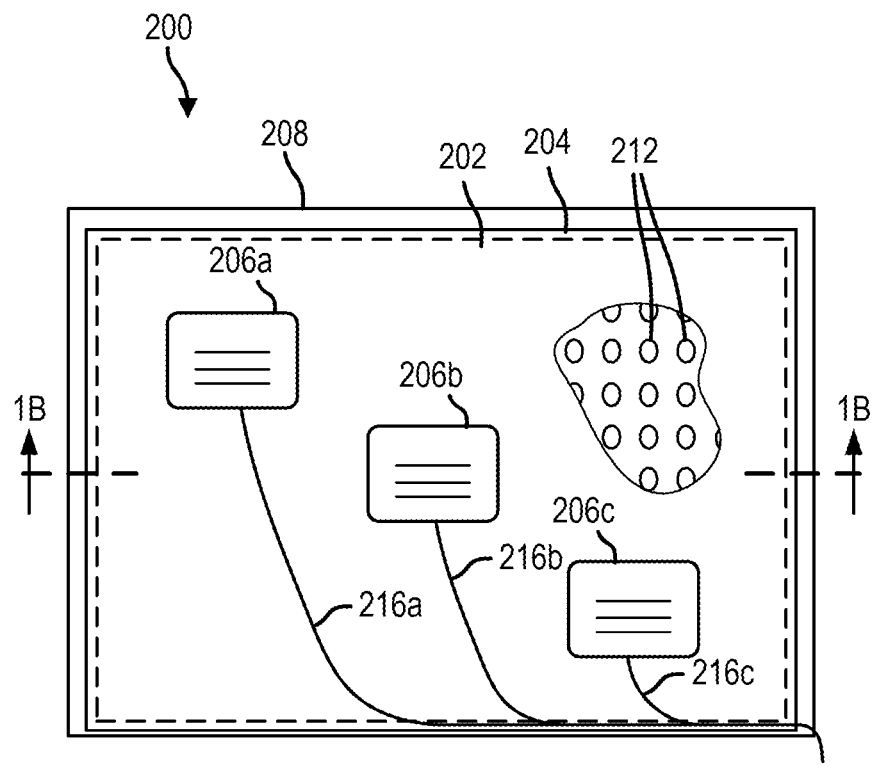
FIG. 2A is a schematic illustration of a dehumidifier system installed over a perforated acoustic skin, in accordance with various embodiments.
Figure 2B:
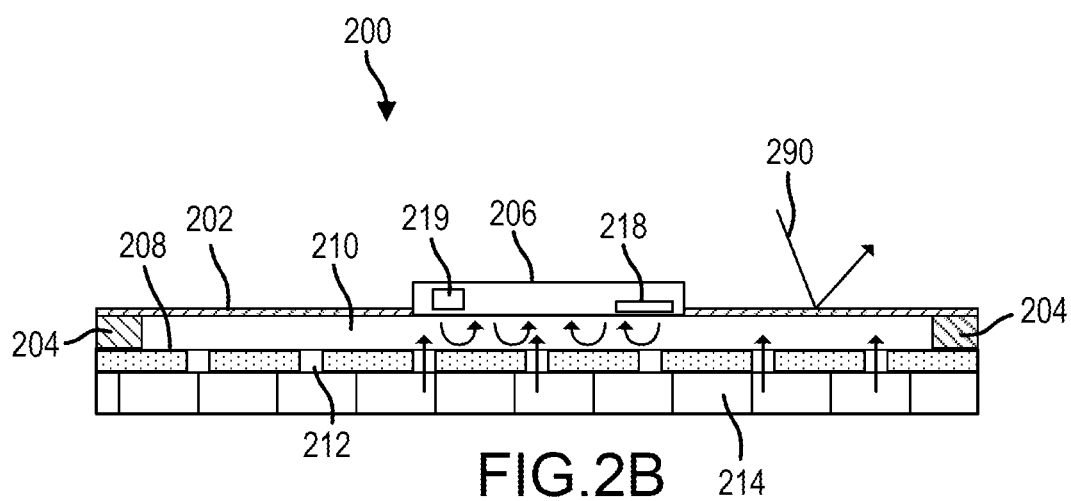
FIG. 2B is a schematic sectional illustration of the dehumidifier system of FIG. 2A, in accordance with various embodiments.

With reference to FIG. 2A and FIG. 2B, a dehumidifier system 200 is illustrated, in accordance with various embodiments. Dehumidifier system 200 comprises a sheet of material 202 (also referred to herein as a "quilt") having a seal 204 disposed about the periphery thereof. Dehumidifier system 200 further comprises at least one dehumidifier (referred to generally as "206"), such as dehumidifier 206a, dehumidifier 206b, and/or dehumidifier 206c. The dehumidifier 206 may be coupled to (e.g., mounted to) the sheet of material 202. In use, a user may secure the sheet of material 202 over at least a portion of an acoustic skin 208 by spreading the sheet of material 202 over the acoustic skin 208 and securing the perimeter thereof to the acoustic skin 208 with the seal 204. Once the sheet of material 202 is in place, the dehumidifier may be activated (e.g., turned on) to evacuate moist air from the acoustic skin 208.

Once the sheet of material 202 is installed over the acoustic skin 208 with the seal 204 adhered to the acoustic skin 208, the sheet of material 202 forms a cavity 210 between the sheet of material 202 and the acoustic skin 208. The acoustic skin 208 may be perforated and comprise a plurality of perforations 212 in fluid communication with a core 214 of the acoustic skin 208. In this manner, the cavity 210 is in fluid communication with the core 214 via the plurality of perforations 212. Core 214 may comprise a honeycomb core structure or the like. Core 214 may include a plurality of resonating cavities. Core 214 may have a height that tunes the resonating cavities to a specific target frequency of the noise to be attenuated.

In various embodiments, sheet of material 202 comprises a film and/or tightly woven fabric configured for reducing the potential of ambient moisture entering cavity 210. Stated differently, sheet of material 202 may block ambient moisture (illustrated by arrow 290) from penetrating sheet of material 202 and entering cavity 210. In various embodiments, sheet of material 202 comprises a plastic film. In various embodiments, sheet of material 202 comprises a tightly woven fabric, such as a polyester or nylon fabric. In various embodiments, sheet of material 202 comprises a tightly woven fabric coated with a waterproof coating, such as polyurethane, among other waterproof coatings.

In various embodiments, seal 204 comprises an adhesive. In various embodiments, seal 204 comprises a double sided adhesive tape.

In various embodiments, dehumidifier 206 is a refrigeration dehumidifier, wherein the dehumidifier 206 receives warm, moist air from cavity 210 and cools the warm air to turn the moisture contained in the warm air into liquid water which can then be routed to an external location or a location contained within the dehumidifier 206. In various embodiments, dehumidifier 206 is an absorption/adsorption dehumidifier, wherein the dehumidifier receives moist air from cavity 210 and "mops" the water out of the air (e.g., with a water-holding material) either by absorption or adsorption which can then be routed to an external location or a location contained within the dehumidifier 206. Dehumidifier 206 may comprise a thermostat and/or a humidity sensor whereby the air within the core 214 is selectively dehumidified.

Dehumidifier system 200 may further comprise at least one outlet tube (referred to generally as "216"), such as tube 216a, tube 216b, and/or tube 216c for routing moisture from each dehumidifier 206 to a location located externally from the sheet of material 202, such as externally to a nacelle for example. Tube 216 may comprise a silicon tube.

With momentary reference to FIG. 1 and FIG. 2A, sheet of material 202 may be secured to a lower portion of the nacelle 112 where moisture may tend to migrate. For example, sheet of material 202 may be secured to a lower half of nacelle 112. Sheet of material 202 may extend along a portion of the circumference of the nacelle 112, such as the lower half (i.e., 50% of the circumference), the lower third (e.g., 33% of the circumference), or the like. In various embodiments, sheet of material 202 extends between 5% and 50% of the circumference of nacelle 112, or between 5% and 33% of the circumference of nacelle 112, in various embodiments.

In various embodiments, dehumidifier system 200 may be operated in an open-loop manner. For example, in between flights, dehumidifier system 200 may be installed over perforated acoustic skin 208 and activated for a duration before the subsequent flight. In various embodiments, dehumidifier system 200 is activated for a predetermined duration before the subsequent flight. However, in various embodiments, dehumidifier system 200 may also be activated in a closed-loop manner (e.g., when the aircraft is parked), whereby the dehumidifier system 200 is turned on or off based upon a measured humidity in the cavity 210.

Figure 3:
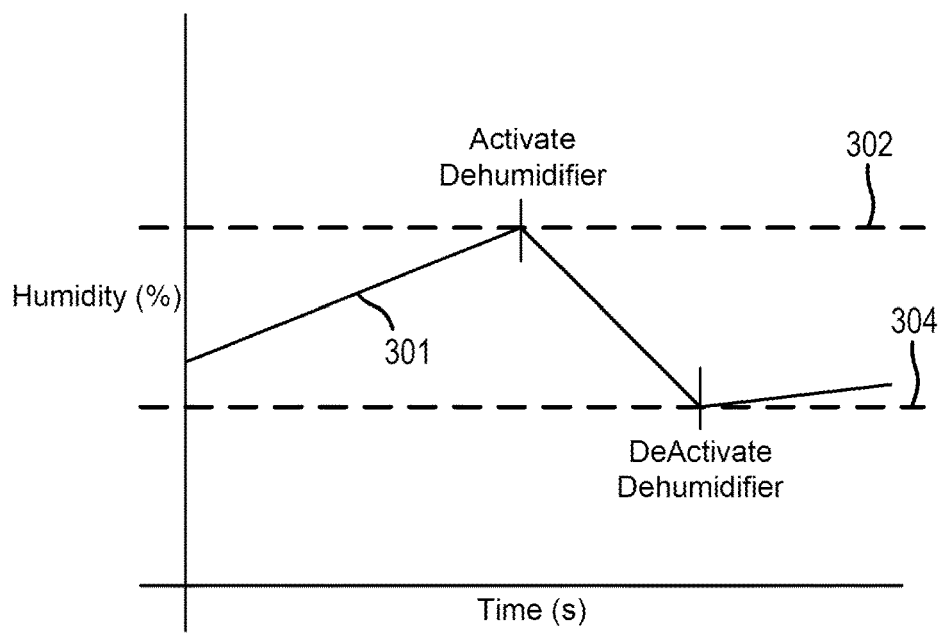
FIG. 3 illustrates a measured humidity level before, during, and after a dehumidifier is activated, in accordance with various embodiments.

With combined reference to FIG. 2B and FIG. 3, dehumidifier 206 may comprise a humidity sensor 218 configured to measure a humidity level, represented by curve 301 in FIG. 3, in cavity 210. In response to the measured humidity level 301 satisfying (e.g., being equal to or exceeding) a predetermined threshold 302, the dehumidifier 206 may be activated (i.e., turned on). As the dehumidifier 206 operates, the humidity in cavity 210 may decrease. In response to the measured humidity level 301 satisfying (e.g., being equal to or less than) a predetermined threshold 304, the dehumidifier 206 may be deactivated (i.e., turned off). In this regard, dehumidifier 206 may comprise an onboard controller 219 (e.g., a processor) configured to activate and deactivate the dehumidifier 206 based upon the humidity sensor feedback.

Figure 4:
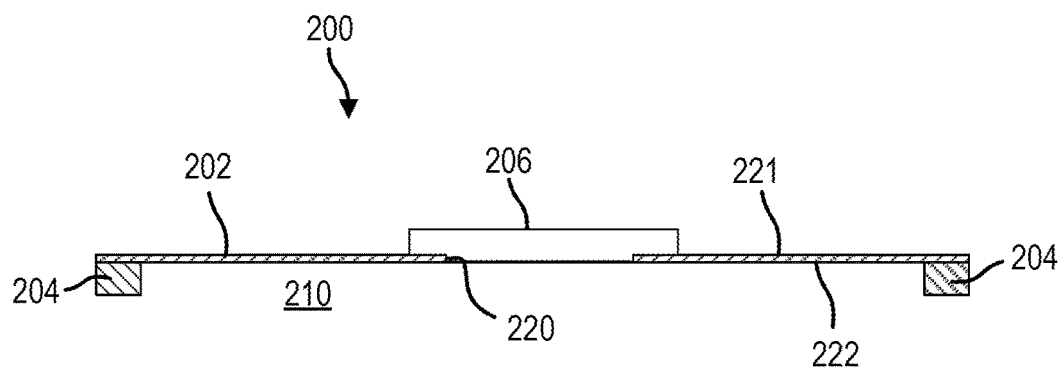
FIG. 4 is a schematic sectional illustration of a dehumidifier system with a dehumidifier mounted to the quilt at a mounting aperture disposed in the quilt, in accordance with various embodiments.
Figure 5:
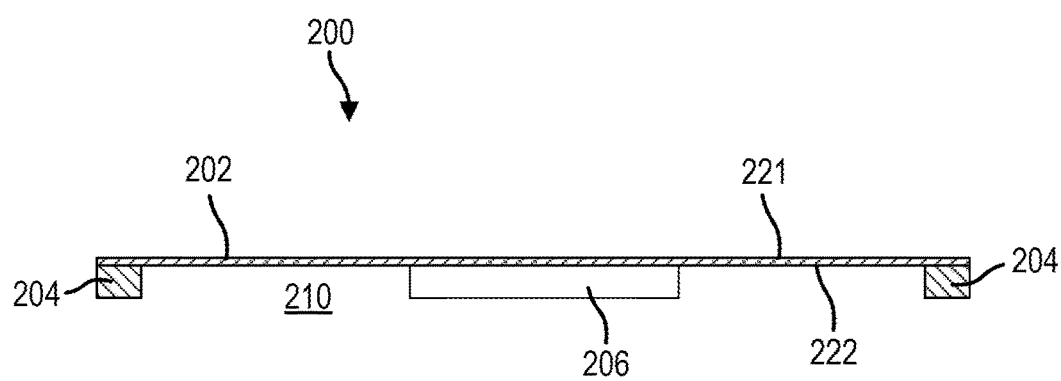
FIG. 5 is a schematic sectional illustration of a dehumidifier system with a dehumidifier mounted to an inner surface of the quilt, in accordance with various embodiments.

With respect to FIG. 4 and FIG. 5, elements with like element numbering, as depicted in FIG. 2B, are intended to be the same and will not necessarily be repeated for the sake of clarity.

With reference to FIG. 4, sheet of material 202 comprises a first surface 221 opposing a second surface 222. Seal 204 may be coupled to second surface 222. Sheet of material 202 may comprise an aperture 220 whereby the dehumidifier 206 is in fluid communication with the second surface 222 (and/or cavity 210). The inlet to dehumidifier 206 may be configured to be sealed from the first surface 221 with the seal 204.

With reference to FIG. 5, dehumidifier 206 may be coupled to the second surface 222. In this manner, in the installed position, dehumidifier 206 may be enclosed within cavity 210 by sheet of material 202. The tube 216, with momentary reference to FIG. 2A, may be routed through and sealed to the sheet of material 202 and/or the seal 204. The tube 216, with momentary reference to FIG. 2A, may be routed between and sealed to seal 204 and acoustic skin 208.

Figure 6:
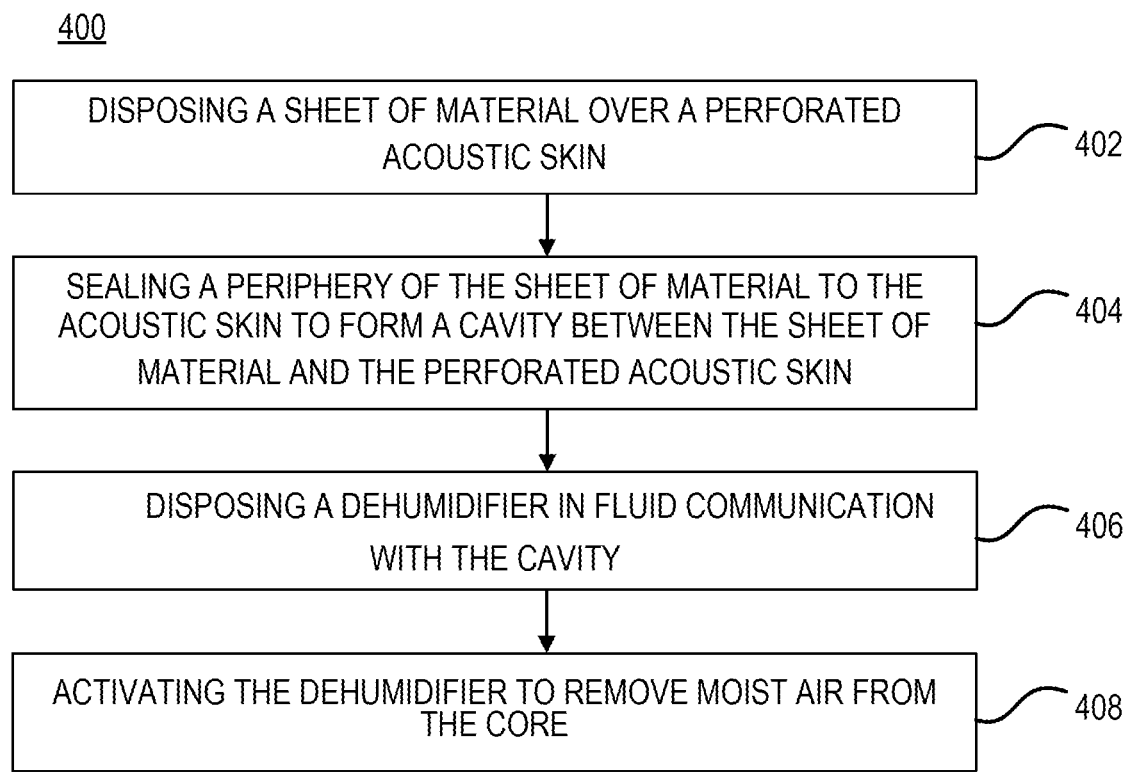
FIG. 6 is a flow chart for a method for dehumidifying an acoustic skin, in accordance with various embodiments.

With reference to FIG. 6, a method 400 for dehumidifying an acoustic skin is provided, in accordance with various embodiments. Method 400 is described with reference to the dehumidifier system 200 of FIG. 2A through FIG. 5, though it should be understood that method 400 is not limited to the dehumidifier system 200 of FIG. 2A through FIG. 5. In step 402, the sheet of material 202 is disposed over perforated acoustic skin 208. In step 404, the periphery of the sheet of material 202 is sealed to the acoustic skin 208 with the seal 204 to form cavity 210 between the sheet of material 202 and the perforated acoustic skin 208. In step 406, the dehumidifier 206 is disposed in fluid communication with the cavity 210. In various embodiments, the dehumidifier 206 is already installed on the sheet of material 202 prior to the sheet of material 202 being installed over the acoustic skin 208, wherein the dehumidifier 206 is automatically in fluid communication with the cavity 210 in response to the cavity 210 being formed. However, it is contemplated that the dehumidifier 206 may be coupled to the sheet of material 202 after the sheet of material 202 is installed over the acoustic skin 208 and/or after the cavity 210 is formed. In step 408, the dehumidifier 206 is activated to remove moist air from the core 214.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for dehumidifying a perforated acoustic skin, the method comprising:
    disposing a sheet of material over the perforated acoustic skin, the perforated acoustic skin comprising a plurality of perforations in fluid communication with a core of the perforated acoustic skin;
    sealing a periphery of the sheet of material to the perforated acoustic skin to form a cavity between the sheet of material and the perforated acoustic skin;
    disposing a dehumidifier in fluid communication with the cavity, the dehumidifier comprises at least one of a refrigeration dehumidifier or an absorption/adsorption dehumidifier;
    activating the dehumidifier to remove moist air from the core; and
    removing the sheet of material from the perforated acoustic skin before a subsequent flight of an aircraft upon which the perforated acoustic skin is located.

2. The method of claim 1, wherein the perforated acoustic skin is located on an aircraft nacelle.

3. The method of claim 1, further comprising detecting a humidity level within the cavity.

4. The method of claim 1, further comprising detecting a first humidity level above a first predetermined threshold, wherein the activating the dehumidifier is in response to the detecting the first humidity level.

5. The method of claim 4, further comprising:
    detecting a second humidity level below a second predetermined threshold; and
    deactivating the dehumidifier in response to the detecting the second humidity level.

6. The method of claim 1, further comprising routing a condensed moisture to a location located externally from an aircraft nacelle.

7. The method of claim 1, wherein the sheet of material comprises a water repellant material.

8. The method of claim 1, wherein the sheet of material comprises a first surface opposing a second surface, and a seal located on the second surface and extending around a periphery of the sheet of material.

9. The method of claim 8, wherein the least one dehumidifier is in fluid communication with the second surface.

10. The method of claim 9, wherein the at least one dehumidifier is configured to be sealed from the first surface with the seal.

11. The method of claim 8, wherein the sheet of material comprises at least one of a plastic film or a tightly woven fabric.

12. The method of claim 8, wherein the seal comprises an adhesive.

13. The method of claim 6, wherein the condensed moisture is routed to the location located externally from the aircraft nacelle via an outlet tube extending from the dehumidifier.

14. The method of claim 8, wherein the at least one dehumidifier is mounted to the sheet of material.

15. The method of claim 4, wherein the first humidity level is detected with a humidity sensor in electronic communication with the dehumidifier.

16. The method of claim 15, wherein the activating the dehumidifier is performed by a controller in electronic communication with the dehumidifier.

17. The method of claim 1, wherein the method is performed between flights of the aircraft while the aircraft is stationary on a ground surface.

18. The method of claim 1, further comprising disposing the dehumidifier in the cavity.

* * * * *